(12) United States Patent
Michel

(10) Patent No.: US 10,145,490 B2
(45) Date of Patent: Dec. 4, 2018

(54) ENHANCED PILOT STAGE SERVOVALVE

(71) Applicant: ZODIAC HYDRAULICS, Chateaudun (FR)

(72) Inventor: Kevin Michel, Bayonne (FR)

(73) Assignee: ZODIAC HYDRAULICS, Chateaudun (FR)

( * ) Notice: Subject to any disclaimer, the term of this patent is extended or adjusted under 35 U.S.C. 154(b) by 12 days.

(21) Appl. No.: 15/165,709

(22) Filed: May 26, 2016

(65) Prior Publication Data

US 2016/0348805 A1   Dec. 1, 2016

(30) Foreign Application Priority Data

May 26, 2015  (FR) ...................................... 15 54715

(51) Int. Cl.
   *F15B 13/043*   (2006.01)
   *F16K 31/42*    (2006.01)
   *F16K 31/08*    (2006.01)

(52) U.S. Cl.
   CPC .......... *F16K 31/42* (2013.01); *F15B 13/0436* (2013.01); *F16K 31/082* (2013.01); *Y10T 137/2322* (2015.04)

(58) Field of Classification Search
   CPC .... F15B 13/0436; F16K 31/082; F16K 31/42; Y10T 137/2322
   USPC ............................................ 137/83; 277/510
   See application file for complete search history.

(56) References Cited

U.S. PATENT DOCUMENTS

| | | | | |
|---|---|---|---|---|
| 2,699,356 A * | 1/1955 | Ziebolz | ..................... | F15C 3/12 137/83 |
| 3,584,638 A * | 6/1971 | Cobb | .................. | F15B 13/0436 137/625.63 |
| 3,584,649 A * | 6/1971 | Cobb | .................. | F15B 13/0436 137/625.61 |
| 3,621,880 A * | 11/1971 | Jessee | ................. | F15B 13/0436 137/625.63 |
| 4,378,031 A * | 3/1983 | Nicholson | ........... | F15B 13/0436 137/625.63 |
| 5,088,383 A * | 2/1992 | Wardle | .................... | F15B 13/07 137/596.15 |
| 2005/0200081 A1* | 9/2005 | Stanton | .................. | F16J 15/183 277/510 |
| 2008/0047616 A1* | 2/2008 | Lovell | ..................... | F16K 41/02 137/315.28 |

(Continued)

*Primary Examiner* — R. K. Arundale
*Assistant Examiner* — Jonathan Waddy
(74) *Attorney, Agent, or Firm* — Muncy, Geissler, Olds & Lowe, P.C.

(57) ABSTRACT

Servovalve with jet-type pilot stage including an ejector for ejecting a jet of fluid that is movable relative to a deflector adapted to generate a pressure differential that can be used to move a power distribution member of the servovalve, the ejector projecting radially from a column extending along a longitudinal axis and to which the ejector is fastened, being in fluid communication with a central passage of the column via which the ejector is fed with fluid, the column having a first end pivotably engaged in a part of the servovalve in the vicinity of a pressure feed thereof and via which the fluid is introduced into the central passage of the column, the column having a second end loaded by a torque motor to apply selectively to the column a rotation torque about the longitudinal axis in either direction relative to a rest position.

8 Claims, 3 Drawing Sheets

(56) References Cited

U.S. PATENT DOCUMENTS

2013/0206260 A1* 8/2013 Ozzello ............... F15B 13/0436
                                                             137/625.6

* cited by examiner

ENHANCED PILOT STAGE SERVOVALVE

The invention relates to a servovalve pilot stage that can serve as the first stage in a two-stage servovalve.

TECHNOLOGICAL BACKGROUND OF THE INVENTION

A conventional servovalve consists of a pilot stage controlling a mobile power distribution member of a power stage. The function of the power stage is to deliver a pressure or a flow rate proportional to an instruction sent to the pilot stage.

The pilot stage includes two hydraulic elements, namely a hydraulic sender (nozzle or ejector) and a hydraulic receiver (paddle, deflector or fixed receiver) modification of the relative position of which generates pressure differentials that are used for precise movement of a mobile power distribution member of the power stage of the servovalve. This mobile power distribution member slides in a cylindrical liner installed in the body of the servovalve. The position of the hydraulic sender or receiver is generally controlled by a torque motor that moves one of the hydraulic elements of the pilot stage relative to the other one. The movement of the mobile power distribution member in its liner then establishes communication between a set of drilled passages and openings the arrangement of which makes it possible to deliver a pressure or a flow rate proportional to the movement of said mobile power distribution member.

Ejector-type servovalves are well known for their high resistance to pollution of the fluid because of a greater distance between the fluid ejector and the deflector compared to the distance separating the nozzles and the paddle in a servovalve with nozzles and a paddle.

It is known to produce such ejector-type servovalves with a fluid ejector fastened to an element that can be twisted and that is built in at one or both of its two ends. Such servovalves require the use of powerful torque motors to apply a twisting torque to the element that can be twisted in order to move the fluid ejector. Such torque motors are heavy and consume a great deal of electrical energy.

Another known disadvantage of servovalves with a jet-type pilot stage is that it is necessary to route the fluid to the ejector over the power stage of the servovalve and its mobile power distribution member. This necessitates costly machining which, given the high pressures of the feed fluid, impose the provision of large additional thicknesses of material exclusively to accommodate the passage feeding fluid to the ejector. There is therefore a portion of the volume of the servovalve and therefore a portion of its weight dedicated to the provision of this passage.

OBJECT OF THE INVENTION

The object of the invention is to reduce the weight of an ejector-type servovalve.

SUMMARY OF THE INVENTION

In order to achieve this object, there is proposed a servovalve with jet-type pilot stage including an ejector for ejecting a jet of fluid that is movable relative to a deflector adapted to generate a pressure differential that can be used to move a power distribution member of the servovalve. The ejector projects radially from a column extending along a longitudinal axis and to which the ejector is fastened, being in fluid communication with a central passage of the column via which the ejector is fed with fluid. The column has a first end pivotably engaged in a part of the servovalve in the vicinity of a pressure feed thereof and via which the fluid is introduced into the central passage of the column. The column has a second end loaded by a torque motor to apply selectively to the column a rotation torque about the longitudinal axis in either direction relative to a rest position.

The column being loaded in rotation and not in torsion, the forces to be applied to it are reduced and it is possible to employ a torque motor of reduced power and therefore reduced mass.

The servovalve advantageously includes elastic means for returning the column to the rest position. The column is therefore returned to the rest position faster than only by the magnetic elements of the torque motor. In accordance with one particular embodiment, the position return means include a thin tube around the column.

The first end of the column advantageously provides a sliding pivot connection with a housing receiving said end. This makes it possible to simplify the operations of assembling the column by avoiding having to stop movement in translation of the column along its longitudinal axis.

In a particularly practical manner, the receiving housing includes a sheath mounted on and sealed to a body of the servovalve. This makes it possible to facilitate the operations of adjusting and matching the column and its receiving housing by avoiding the need to carry out an adjustment on the body itself of the servovalve.

The sheath is advantageously screwed into position.

BRIEF DESCRIPTION OF THE FIGURES

The invention will be better understood in the light of the following description of one particular embodiment of the invention given with reference to the following figures.

DETAILED DESCRIPTION OF THE FIGURES

Figure 1:
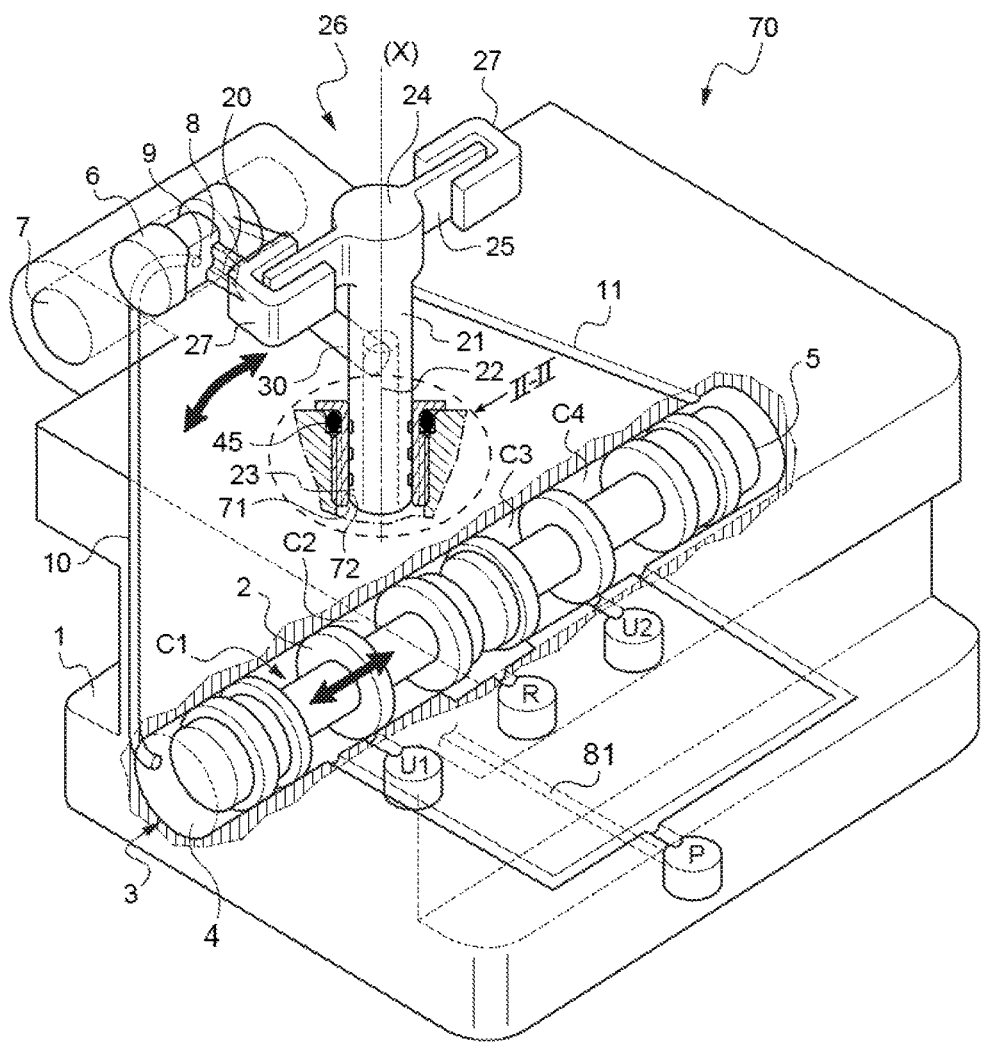
FIG. 1 is a theoretical diagram of the application of the invention to a servovalve in accordance with a first particular embodiment of the invention, with the torque motor omitted.
Figure 2:
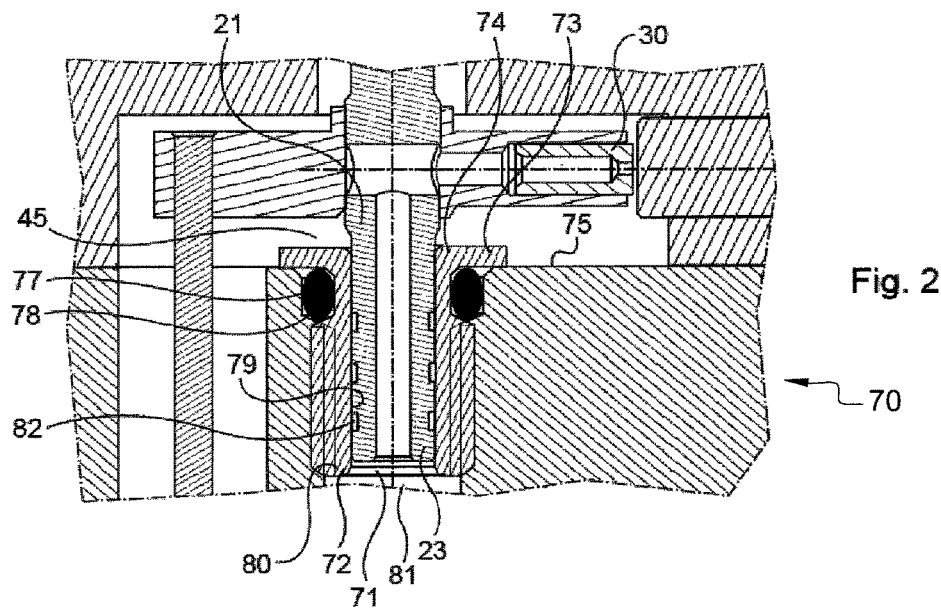
FIG. 2 is a sectional detail view of the area II-II identified in FIG. 1.

Referring to FIGS. 1 and 2, the invention is illustrated here when applied to a two-stage barometric flow rate regulation servovalve one stage of which is a pilot stage. Of course, the invention is not limited to this application and could be used for other types of servovalves.

The servovalve generally designated 70 includes a body 1 in which a power distribution member 2 is mounted to slide in a sealed manner in a cylindrical orifice 3 to form the distribution stage. The power distribution member 2 is mobile between two extreme positions and is conformed to delimit in the orifice 3 sealed chambers C1, C2, C3, C4 for establishing communication between, respectively, according to the extreme position of the power distribution member 2 relative to a centred position (or neutral position):

either a feed port P and a first utilization port U1 and a return port R and a second utilization port U2, or the feed port P and the second utilization port U2 and the return port R with the first utilization port U1. The sliding of the power distribution member 2 in the orifice 3 is controlled by pilot chambers 4, 5 that are fed with fluid under pressure by a pressure distribution member, here a deflector 6 engaged in a sealed manner in a housing 7 of the body 1. The deflector 6 includes a central flat 8 in which there is a distribution orifice 9. The distribution orifice 9 communicates via passages 10, 11 with the pilot chambers 4 and 5. Springs (not shown) are provided to exert a counter-reaction to the pilot pressures induced on the power distribution member 2 in order to be able to control the position of the latter.

Facing the central flat 8 is a fluid ejector 20 that ejects a jet of fluid toward the distribution orifice 9. The ejector 20 is movable relative to the distribution orifice 9 so as to move the point of impact of the jet on the central flat 8, the effect of which is to vary the pressures in the pilot chambers 4, 5, which makes it possible to move the power distribution member in response to the movement of the ejector 20. All this is well known and is mentioned only to situate the context of the invention.

In accordance with an essential aspect of the invention, the ejector 20 is fastened to a column 21 and is fixed at the end of a tube 30 that extends radially from the latter and is in fluid communication with a central passage 22 of the column 21 via which the ejector 20 is fed with fluid. The column 21 extends along a longitudinal axis X and has a first end 23 that is pivotably engaged in a receiving housing 71 of the body 1 of the servovalve 70.

This receiving housing 71 is delimited by a sheath 72 mounted here by screwing it into the body 1 of the servovalve 70. The sheath 72 is of cylindrical shape with axis X and includes a disk-shaped portion 73 at its first end 74 that rests on a plane portion 75 of a chamber 45 into which the tube 30 extends. The outside face of the sheath 72 includes an O-ring seal 77 received in an annular housing 78 of the body 1 of the servovalve 70 that seals the sheath 72 to the body 1. The sheath 72 includes an axial bore 79 extending from the first end 74 of the sheath to its second end 80 and in which the first end 23 of the column 21 is rotatably and slidably engaged. The connection defined in this way between the body 1 of the servovalve 70 and the column 21 corresponds to a sliding pivot connection. The bore 79 extends between the chamber 45 and a feed passage 81 in fluid communication with the feed port P to feed the central passage 22 of the column 21. The feed passage 81 is shown in dashed line in FIG. 1 and may be drilled directly into the body 1 of the servovalve 70. The first end 23 of the column 21 is ideally located in a part of the body 1 in the vicinity of the pressure feed. This makes it possible to eliminate the need to have one or more feed passages of the ejector 20 pass over the distribution assembly.

As can be seen in FIG. 2, the outside surface of the end 23 of the column 21 includes three peripheral expansion grooves 82. These grooves 82 and the diametral fit of the column 23 in the bore 79 make it possible to control internal leakage of fluid between the passage 81 and the chamber 45.

The column 21 has a second end 24 that is fastened to the rotor 25 of a torque motor 26 the stator 27 of which is fixed to the body 1.

Accordingly, when the torque motor 26 is energized, it causes the column 21 to rotate about its longitudinal axis X, causing angular movement of the ejector 20 relative to the distribution orifice 9 so that the impact of the jet produced by the ejector 20 is moved relative to the distribution orifice 9.

The movement of the point of impact of the jet is small and is like a movement in translation along the tangent to the trajectory of the ejector 20. A high level of proportionality is preserved between this movement and the torque imposed on the column by the torque motor 26, and therefore with the supply current of the latter.

When the torque motor 26 is not energized, the rotor 25 returns to its rest position by virtue of balancing of the magnetic masses and the jet produced by the ejector 20 impacts on the central flat 8 of the deflector at a location such that the pressures in the pilot chambers 4, 5 balance. To this end, the deflector 6 includes adjustment means for positioning it precisely in the housing 7 relative to the ejector. The sliding pivot connection of the column 21 to the body 12 of the servovalve opposes a very small resistance to the movement of the ejector 20 relative to the distribution orifice 9. The electrical power absorbed by the torque motor 26 is low compared to prior art torque motors. It is then possible to use a torque motor developing less mechanical power and therefore having a lower mass. This feature together with a reduction of the volume of the body 1 of the servovalve 70 reserved for the feed passage 81 makes it possible to obtain a servovalve 70 that is much lighter and consumes less electrical energy than prior art servovalves.

Figure 3:
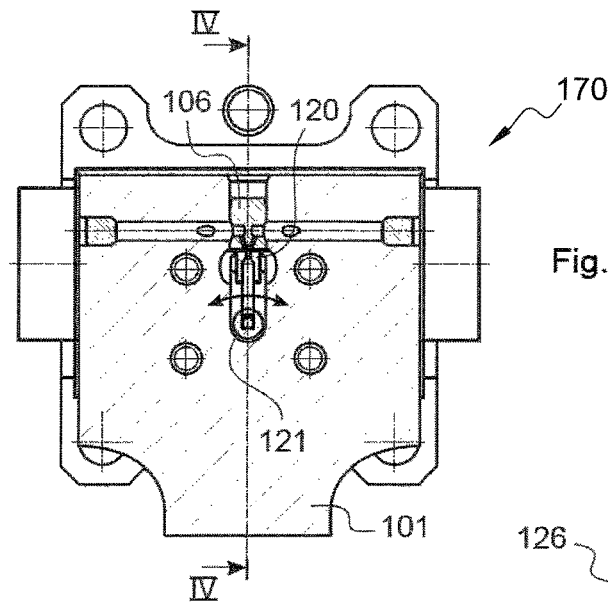
FIG. 3 is a view in section taken along the line in FIG. 4 of a servovalve in accordance with a second particular embodiment of the invention.
Figure 4:
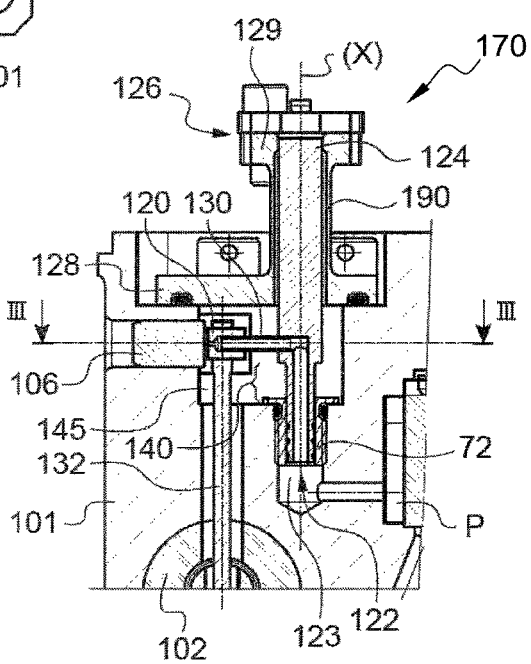
FIG. 4 is a view in section taken along the line IV-IV in FIG. 3.

Now in accordance with a second particular embodiment shown in FIGS. 3 and 4, and where the references of elements common with those of FIG. 1 are increased by 100, the servovalve 170 includes, as before, a body 101 in which a power distribution member 102 is slidably mounted. The pilot stage includes a deflector 106 and an ejector 120 that is fastened to a column 121 and mounted at the end of a tube 130 that extends radially from the column 121. The column 121 has a first end that provides a sliding pivot connection in the body 101 and a second end 124 acted on by a torque motor 126. The column 121 includes a central passage 122 enabling fluid communication to be established between the ejector 120 and the feed port P by the first end 123 via the central passage 122 and the tube 130. It is again seen here that the end 123 of the column is located in the vicinity of the pressure feed of the servovalve.

In accordance with one particular aspect of the invention, here the column 121 is surrounded by a thin tube 190 that extends from a baseplate 128 fixed in a sealed manner to the body of the servovalve to a foot 129 that grips the end 124 of the column. The foot 129 and said end are fixed to each other so that when rotation is caused by the torque motor 126 the thin tube 190 operates in torsion. This feature makes it possible to seal the chamber 145 into which the ejector 120 ejects the fluid without recourse to a rubbing seal at the level of the end 124 of the column cooperating with the torque motor 190 and liable to create hysteresis. The thin tube 190 elastically returns the column 121 to its rest position and makes it possible to improve the responsiveness of the servovalve 70 relative to a return to the rest position produced exclusively by the magnetic effect of the torque motor 126 on the stator 127.

In accordance with another particular aspect of the invention, the elastic feedback between the power distribution member 102 and the ejector 120 is provided here by a flexible rod 132 extending between the ejector 120 and the power distribution member 102. The rod extends parallel to the column 121.

Figure 5:
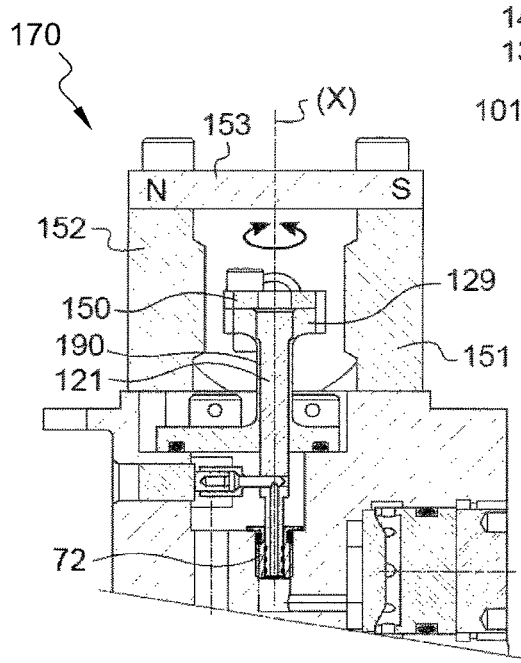
FIG. 5 is a view analogous to that of FIG. 4 showing the torque motor.

The torque motor 126 is now described in detail with reference to FIGS. 4 to 6. It includes a paddle 150 that includes two opposite arms 150a, 150b and is screwed to the foot 129. The paddle 150 is surrounded by a ferromagnetic armature having two flanks 151, 152 that are connected in the upper part by a permanent magnet 153 polarized north-south as shown in FIG. 4.

Figure 6:
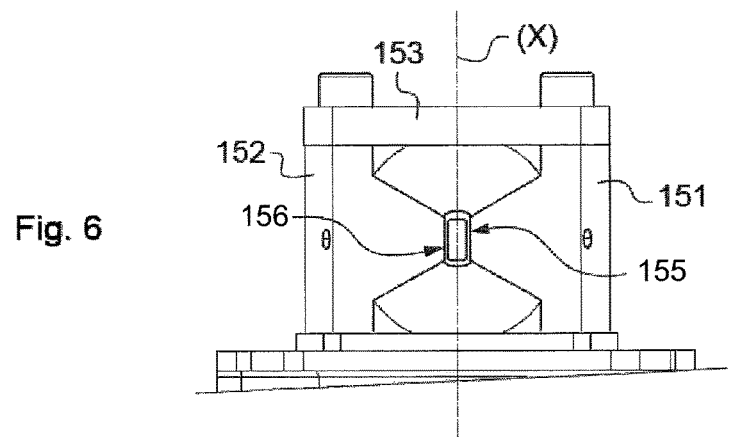
FIG. 6 is a partial side view of the servovalve from FIGS. 2 to 5.

As can be seen in FIG. 6, the flanks 151, 152 have active faces 155, 156 immediately facing the faces of the paddle 150, leaving only a small air gap on either side of the longitudinal axis X. The permanent magnet 153 then generates magnetic fluxes that pass through the active faces 155, 156 and each of which is closed in one of the arms of the paddle 150 on either side of the axis. The fluxes being equal, the paddle is not subjected to any torque.

Figure 7:
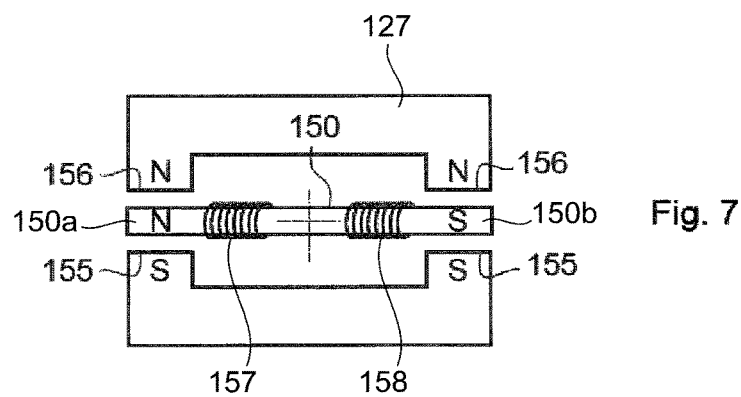
FIG. 7 is a theoretical diagram showing the respective polarizations of the paddle and the stator of the servovalve.

Windings 157, 158 disposed to surround each of the arms of the paddle 150 are energized oppositely, and there is therefore produced on the paddle 150 a torque proportional to the product of the supply current of the windings 157 and the number of turns thereof to generate a magnetic flux within the paddle so as to produce a North pole on the part 150a and a South pole on the part 150b (see FIG. 7). This creates a torque on the paddle 150 causing rotation of the column 121 and twisting of the tube 190.

Of course, this rotation of the column 121 is very small, of the order of a few tenths of a degree. It will suffice to reverse the direction of the supply current of the windings to reverse the direction of the rotation.

The invention is not limited to what has just been described, of course, but encompasses any variant within the scope defined by the claims.

In particular:
- although here the column is mounted in parallel with a thin tube that can be twisted, this mounting can be avoided if the chamber into which the ejector sends the fluid is sealed; in particular, a bellows could be used, or a seal capable of deforming in torsion without slipping or rubbing and exhibiting no hysteresis;
- although here the sheath is screwed to the body of the servovalve, the invention applies equally to other ways of connecting the sheath to the body of the servovalve such as, for example, welding, gluing, brazing or crimping, some of these processes making it possible to dispense with a seal;
- although here the seal is provided by an O-ring seal accommodated in an annular groove, the invention applies equally to other types of static seal such as, for example, a seal that is flat or of any section;
- although here the connection between the body of the servovalve and the column is of the sliding pivot type, the invention applies equally to a simple pivot-type connection;
- although here the first end of the column is received in a receiving housing of a sheath mounted on the body of the servovalve, the invention applies equally to a column received in a receiving housing produced directly in the body of the servovalve;
- although here the column includes three expansion grooves, the invention applies equally to a column including a different number of expansion grooves such as, for example, one, two or more than three;
- although here the column is surrounded by a thin tube that can be twisted, the invention applies equally to other rest position return elastic means such as, for example, a coil spring or an elastomer sleeve.

The invention claimed is:

1. A servovalve with jet-type pilot stage including an ejector for ejecting a jet of fluid and that is movable relative to a deflector adapted to generate a pressure differential that can be used to move a power distribution member of the servovalve, the ejector projecting radially from a column extending along a longitudinal axis and to which the ejector is fastened, the ejector being in fluid communication with a central passage of the column via which the ejector is fed with fluid, the column having a first end pivotably engaged in a part of the servovalve in the vicinity of a pressure feed thereof and via which the fluid is introduced into the central passage of the column, the column having a second end loaded by a torque motor to apply selectively to the column a rotation torque about the longitudinal axis in either direction relative to a rest position, the servovalve further comprising elastic means for returning the column to the rest position, the elastic means including a thin tube surrounding the column,
wherein the entire column is pivotable with respect to the servovalve.

2. The servovalve according to claim 1, wherein the first end of the column provides a sliding pivot connection with a housing receiving the first end of the column.

3. The servovalve according to claim 2, wherein the housing receiving the first end of the column is delimited by a sheath mounted on and sealed with respect to a body of the servovalve.

4. The servovalve according to claim 3, wherein the sheath is screwed onto the body of the servovalve.

5. The servovalve according to claim 3, wherein the sheath includes a static seal.

6. The servovalve according to claim 1, wherein the first end of the column includes at least one expansion groove.

7. The servovalve according to claim 1, wherein the second end of the column is built into a foot at the end of the thin tube surrounding the column, the thin tube being fastened to a baseplate that closes and seals a chamber into which the ejector ejects the fluid.

8. The servovalve according to claim 1, wherein the torque motor includes a paddle having two opposite arms that are subjected to the electromagnetic action of a permanent magnet, the torque motor including two windings each surrounding one arm of the paddle and energized oppositely to generate an opposite polarization of the arms of the paddle so as to create a torque on the paddle.

* * * * *